US009200710B2

(12) United States Patent
Nishioka

(10) Patent No.: US 9,200,710 B2
(45) Date of Patent: Dec. 1, 2015

(54) FLOATING SEAL

(71) Applicant: KOMATSU LTD., Tokyo (JP)

(72) Inventor: Masato Nishioka, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/355,965

(22) PCT Filed: Sep. 27, 2012

(86) PCT No.: PCT/JP2012/074903
§ 371 (c)(1),
(2) Date: May 2, 2014

(87) PCT Pub. No.: WO2014/027426
PCT Pub. Date: Feb. 20, 2014

(65) Prior Publication Data
US 2014/0300060 A1 Oct. 9, 2014

(30) Foreign Application Priority Data

Aug. 13, 2012 (JP) ................................. 2012-179492

(51) Int. Cl.
*F16J 15/34* (2006.01)
(52) U.S. Cl.
CPC ............ *F16J 15/3496* (2013.01); *F16J 15/344* (2013.01)
(58) Field of Classification Search
CPC .................................. F16J 15/30; C22C 37/10
USPC .............................. 277/404; 148/323; 420/14
See application file for complete search history.

(56) References Cited

U.S. PATENT DOCUMENTS

| 2,662,011 | A | * | 12/1953 | Seigle et al. ..................... 420/16 |
| 3,588,128 | A | * | 6/1971 | Petersen ......................... 277/384 |
| 3,897,956 | A | * | 8/1975 | Kurio et al. .................... 277/357 |
| 4,505,485 | A | * | 3/1985 | Hirakawa ....................... 277/400 |
| 4,822,415 | A | * | 4/1989 | Dorfman et al. ................. 420/61 |
| 4,844,483 | A | * | 7/1989 | Iijima et al. .................... 277/382 |
| 5,085,716 | A | * | 2/1992 | Fuerst et al. ................... 148/301 |
| 5,149,249 | A | * | 9/1992 | Schellong et al. ............ 277/369 |

(Continued)

FOREIGN PATENT DOCUMENTS

| JP | 7-90475 A | 4/1995 |
| JP | 10-99953 A | 4/1998 |

(Continued)

OTHER PUBLICATIONS

The International Search Report for the corresponding international application No. PCT/JP2012/074903, issued on Jul. 24, 2013.

(Continued)

*Primary Examiner* — Kristina Fulton
*Assistant Examiner* — Eugene G Byrd
(74) *Attorney, Agent, or Firm* — Global IP Counselors, LLP

(57) ABSTRACT

A floating seal comprises C, Si, Mn, Ni, Cr, Mo, V, and B with the remainder being made up of Fe and unavoidable impurities. The contents of the C, Si, Mn, Ni, Cr, Mo, V and B are C: 2.2 to 3.9 wt %, Si: 0.5 to 3.5 wt %, Mn: 0.1 to 2.0 wt %, Ni: 0.5 to 4.3 wt %, Cr: 7.5 to 25.0 wt %, Mo: 0 to 8.0 wt % (excluding 0 %), V: 0 to 6.0 wt % (excluding 0%), and B: 0.02 to 0.4 wt %. The content of Cr in the parent phase is 2.00 to 5.41 wt %. The content of graphite is 0.05 to 0.35% of the surface area. The content of carbon boride is 19 to 40% of the surface area.

2 Claims, 7 Drawing Sheets

(56) References Cited

U.S. PATENT DOCUMENTS

| | | | |
|---|---|---|---|
| 5,525,779 A * | 6/1996 | Santella et al. | 219/137 WM |
| 6,045,029 A * | 4/2000 | Scott | 228/122.1 |
| 6,953,508 B2 * | 10/2005 | Ikeda et al. | 148/320 |
| 8,765,052 B2 * | 7/2014 | Wallin et al. | 420/12 |
| 2002/0195180 A1 * | 12/2002 | Menk et al. | 148/612 |
| 2005/0183794 A1 * | 8/2005 | Okada et al. | 148/323 |
| 2006/0159376 A1 | 7/2006 | Takayama et al. | |
| 2007/0045966 A1 * | 3/2007 | Jiang et al. | 277/404 |
| 2007/0187369 A1 * | 8/2007 | Menon et al. | 219/76.1 |
| 2007/0194537 A1 * | 8/2007 | Lerchbaum et al. | 277/404 |
| 2009/0045586 A1 * | 2/2009 | Cantow | 277/406 |
| 2010/0065163 A1 * | 3/2010 | Branagan et al. | 148/561 |
| 2010/0119872 A1 * | 5/2010 | Lundeen et al. | 428/682 |
| 2011/0162612 A1 * | 7/2011 | Qiao et al. | 123/188.3 |

FOREIGN PATENT DOCUMENTS

| | | |
|---|---|---|
| JP | 2002-234026 A | 8/2002 |
| JP | 2005-240065 A | 2/2004 |
| JP | 2008-221312 A | 3/2007 |
| JP | 2008-221311 A | 9/2008 |
| WO | 2005/012585 A1 | 2/2005 |

OTHER PUBLICATIONS

The Office Action for the corresponding Korean application No. 10-2014-7011570, issued on Jul. 13, 2015.

* cited by examiner

FLOATING SEAL

CROSS-REFERENCE TO RELATED APPLICATIONS

This application is a U.S. National stage application of International Application No. PCT/JP2012/074903, filed on Sep. 27, 2012. This U.S. National stage application claims priority under 35 U.S.C. §119(a) to Japanese Patent Application No. 2012-179492, filed in Japan on Aug. 13, 2012, the entire contents of which are hereby incorporated herein by reference.

BACKGROUND

Field of the Invention

The present invention relates to a floating seal.

Background Information Conventionally, crawler-type work machines, such as hydraulic excavators or bulldozers, are equipped with rotating wheels such as drive wheels, idler wheels, carrier rollers, and trunk rollers. Rotating wheels are provided with a seal structure to prevent leakage of lubricating oil for the bearings and to prevent the intrusion of moisture and dirt and the like.

A seal structure is normally configured by a pair of floating seals and a pair of elastic rings that are provided between a stationary housing and a rotatable housing. The floating seals that form the pair have a ring shape and are free to slide on the same axis. The floating seals are supported on the housings through the elastic rings that are in contact with the external peripheries of the floating seals (see Japanese Laid-open Patent Publication No. 2005-240065).

This type of floating seal is manufactured with a centrifugal casting method or a sand mold casting method (see, for example, Japanese Laid-open Patent Publication No. 2008-221311, Japanese Laid-open Patent Publication No. 2008-221312, and Japanese Laid-Open Patent Publication No. H10-99953.

SUMMARY

High strength as well as abrasion resistance and seizing resistance are expected in a floating seal. Increasing the wall thickness of the floating seal may be considered as a method to increase the strength, but this leads to higher costs.

Hard carbides are generally separated as crystals in large amounts to improve abrasion resistance and seizing resistance in a floating seal. However, separating large amounts of the carbides as crystals runs counter to improving the strength. Conversely, the strength of the floating seal can be improved by changing the constituent amounts, such as reducing the amount of carbon, to lower the amount of carbides. However, problems in manufacturing efficiency arise when the amount of carbon is reduced so that casting fluidity is adversely affected and the rate of manufacturing defects increases. Moreover, abrasion resistance and seizing resistance may deteriorate when the amount of carbides is reduced.

An object of the present invention is to provide a floating seal that allows for improvements in strength, heat resistance, and abrasion resistance while limiting a reduction in manufacturing efficiency.

A floating seal according to a first exemplary embodiment of the present invention comprises C, Si, Mn, Ni, Cr, Mo, V and B with the remainder being made up of Fe and unavoidable impurities. The contents of the C, Si, Mn, Ni, Cr, Mo, V and B are: C: 2.2 to 3.9 wt %, Si: 0.5 to 3.5 wt %, Mn: 0.1 to 2.0 wt %, Ni: 0.5 to 4.3 wt %, Cr: 7.5 to 25.0 wt %, Mo: 0 to 8.0 wt % (excluding 0%), V: 0 to 6.0 wt % (excluding 0%), and B: 0.02 to 0.4 wt %. The content of Cr in the parent phase is 2.00 to 5.41 wt %. The content of graphite 0.05 to 0.35% of the surface area. The content of carbon boride is 19 to 40% of the surface area.

The floating seal according to a second exemplary embodiment of the present invention is related to the floating seal of the first exemplary embodiment, wherein the content of Cr in the parent phase is 2.00 to 3.50 wt %. The content of graphite is 0.05 to 0.30% of the surface area. The content of carbon boride is 25 to 35% of the surface area.

The relationship between the content of Cr in the parent phase, the content of graphite, and the content of carbides is adjusted by adding B to the floating seal in the present invention. Graphite is easily separated when B is added to the floating seal. As a result, the separation amount of carbides is reduced. Consequently, the strength of the floating seal is improved. The casting fluidity can be maintained by avoiding a reduction in the amount of carbon while enabling a reduction in the separation amount of carbides. As a result, a reduction in manufacturing efficiency is limited. Moreover, abrasion resistance is improved due to the separation of graphite despite the reduction in the separation amount of the carbides. Further, compatibility resistance is improved due to the separated graphite. Furthermore, Cr to be separated as carbides when B is not added blends into the parent phase because the separation amount of the carbides is reduced. Consequently, the content of Cr in the parent phase is increased. As a result, heat resistance is improved. The relationship between the content of Cr, the content of graphite, and the content of carbides in the parent phase are interrelated and adjusted due to the addition of B to the floating seal in the present invention. As a result, strength, heat resistance, and abrasion resistance can be improved while a reduction in manufacturing efficiency is limited.

DESCRIPTION OF EXEMPLARY EMBODIMENTS

Figure 1:
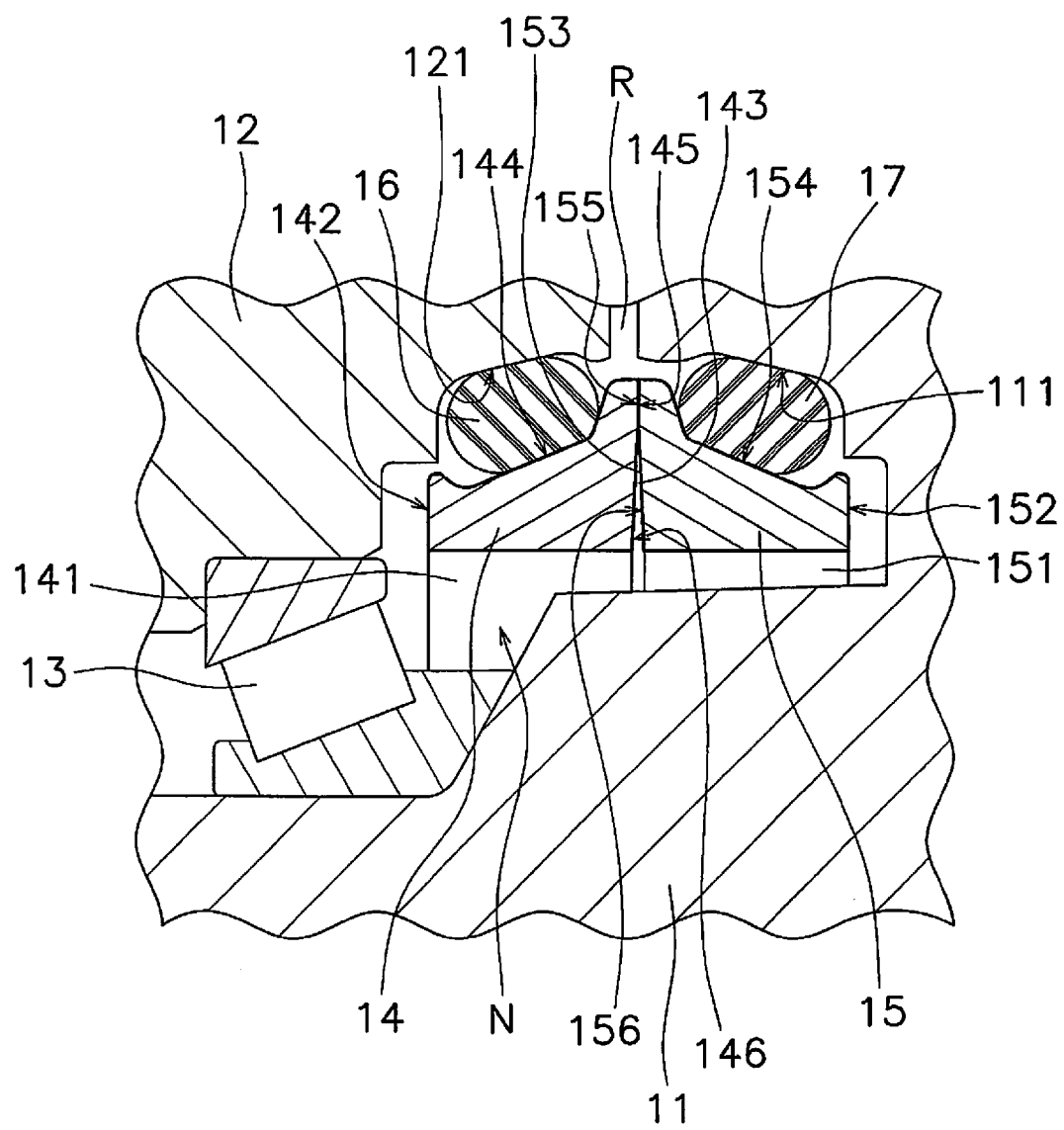
FIG. 1 is a cross-sectional view of a seal structure.

Next, exemplary embodiments of the present invention will be explained with reference to the drawings. In the following description of the drawings, identical or similar parts are given identical or similar reference numerals. However, the drawings are schematic and dimensional ratios and the like may differ from the actual objects. Therefore, detailed dimensions and the like should be determined in consideration of the following drawings. Moreover, it is needless to say that parts with mutually different dimensional relationships or ratios are included in the drawings.

Seal Structure Configuration

First, a seal structure in which is used a floating seal according to an exemplary embodiment of the present invention will be described. FIG. 1 is a cross-sectional view of a seal structure. The seal structure, for example, is provided in a final drive gear included in a crawler-type work machine, such as a hydraulic excavator or a bulldozer.

The seal structure is provided between a stationary side member 11 and a rotating side member 12. The rotating side member 12 is attached to the stationary side member 11 via a bearing 13. The rotating side member 12 is provided in a manner that allows rotation relative to the stationary side member 11. The seal structure seals an internal space N filled with lubricating oil for the bearing 13. The seal structure limits leakage of the lubricating oil from the internal space N. The seal structure further limits the intrusion of moisture and dirt into the internal space N from a gap R between the stationary side member 11 and the rotating side member 12.

The seal structure has a first floating seal 14, a second floating seal 15, a first elastic ring 16, and a second elastic ring 17. The first floating seal 14 and the second floating seal 15 are both floating seals as described below. The first elastic ring 16 and the second elastic ring 17 are rubber members made of, for example, nitrile rubber or silicone rubber.

Figure 2:
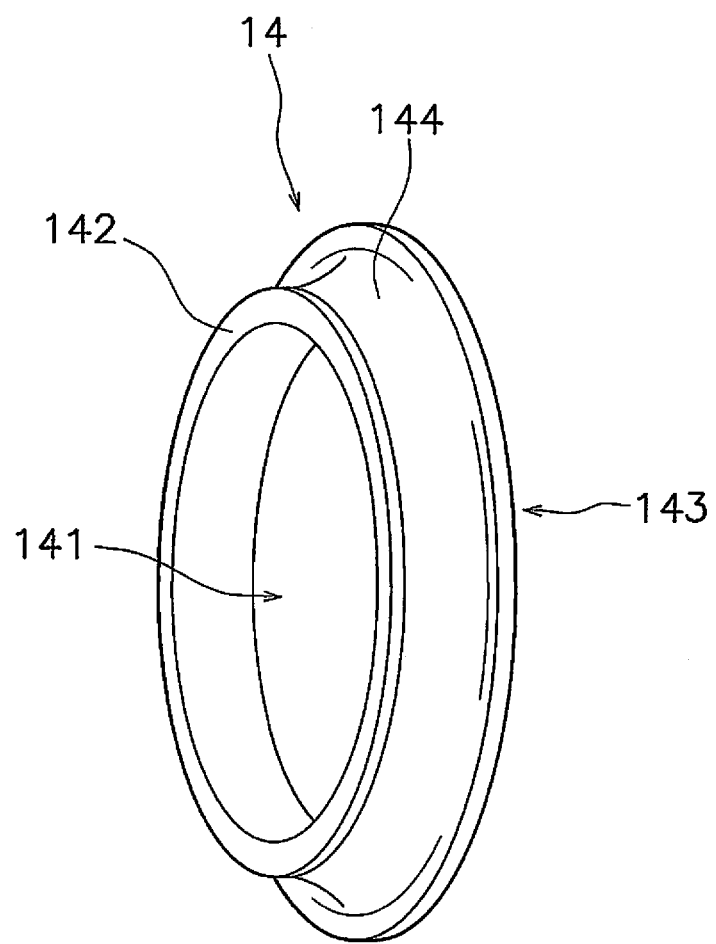
FIG. 2 is a perspective view of a floating seal.

FIG. 2 is a perspective view of the first floating seal 14. The first floating seal 14 has a ring-like shape with a through-hole 141. As illustrated in FIG. 1, a portion of the stationary side member 11 is inserted into the through-hole 141 of the first floating seal 14. However, the inner surface of the first floating seal 14 is arranged away from the stationary side member 11 and is not in contact with a stationary member. The first floating seal 14 is elastically supported on the rotating side member 12 via the first elastic ring 16.

The second floating seal 15 also has a ring-like shape with a through-hole 151 similar to the first floating seal 14. The second floating seal 15 is arranged concentrically to the center axis of the first floating seal 14. The second floating seal 15 is arranged symmetrically with the first floating seal 14 on a plane perpendicular to the center axis. The second floating seal 15 is supported elastically on the stationary side member 11 via the second elastic ring 17. The first floating seal 14 and the second floating seal 15 are arranged opposite each other. The first floating seal 14 slides on the second floating seal 15 due to rotation with the rotating side member 12.

The first floating seal 14 has a first distal end surface 142, a first bottom surface 143, and a first side surface 144. The second floating seal 15 has a second distal end surface 152, a second bottom surface 153, and a second side surface 154. The first distal end surface 142 is positioned on the opposite side of the first bottom surface 143. The second distal end surface 152 is positioned on the opposite side of the second bottom surface 153. The first bottom surface 143 and the second bottom surface 153 are arranged to face each other.

The first bottom surface 143 has a first sliding surface 145 and a first taper surface 146. The second bottom surface 153 has a second sliding surface 155 and a second taper surface 156. The first sliding surface 145 is positioned on the first bottom surface 143 to the outside of the first taper surface 146 in the radial direction. The second sliding surface 155 is positioned on the second bottom surface 153 to the outside of the second taper surface 156 in the radial direction. The first sliding surface 145 and the second sliding surface 155 are in contact with each other. The first taper surface 146 and the second taper surface 156 are sloped so that the distance therebetween widens toward the inside in the radial direction.

The first side surface 144 contacts the first elastic ring 16. The first side surface 144 has a concave shape. The first elastic ring 16 is held due to the concave shape of the first side surface 144. The first side surface 144 slopes so that the outer diameter decreases from the first bottom surface 143 toward the first distal end surface 142. The rotating side member 12 has a first contact surface 121 that contacts the first elastic ring 16. The first contact surface 121 slopes in the same direction as the first side surface 144. The second side surface 154 contacts the second elastic ring 17. The second side surface 154 has a concave shape. The second elastic ring 17 is held due to the concave shape of the second side surface 154. The second side surface 154 slopes so that the outer diameter decreases from the second bottom surface 153 toward the second distal end surface 152. The stationary side member 11 has a second contact surface 111 that contacts the second elastic ring 17. The second contact surface 111 slopes in the same direction as the second side surface 154.

The first sliding surface 145 slides against the second sliding surface 155 due to the first floating seal 14 rotating with the rotating side member 12. The first sliding surface 145 and the second sliding surface 155 are pressed against each other due to elastic force from the first elastic ring 16 and the second elastic ring 17. As a result, the area between the first sliding surface 145 and the second sliding surface 155 is sealed tightly when the rotating side member 12 is rotating or stopped.

Floating Seal Configuration

The following is a description of the composition of the floating seal. A floating seal according to the present exemplary embodiment comprises C, Si, Mn, Ni, Cr, Mo, V, B with the remainder being made up of Fe and unavoidable impurities. The contents of the C, Si, Mn, Ni, Cr, Mo, V and B are: C: 2.2 to 3.9 wt %, Si: 0.5 to 3.5 wt %, Mn: 0.1 to 2.0 wt %, Ni: 0.5 to 4.3 wt %, Cr: 7.5 to 25.0 wt %, Mo: 0 to 8.0 wt % (excluding 0%), V: 0 to 6.0 wt % (excluding 0%), and B: 0.02 to 0.4 wt %. The content of Cr in the parent phase is 2.00 to 5.41 wt %. The content of graphite is 0.05 to 0.35% of the surface area. The content of carbon boride is 19 to 40% of the surface area. More preferably, the content of Cr in the parent phase is 2.00 to 3.50 wt %, the content of graphite is 0.05 to 0.30% of the surface area, and the content of carbon boride is 25 to 35% of the surface area. The significance of the constituents are as follows.

C forms carbides. Moreover, C is necessary for the parent phase to become martensite. However, when the content of C is too low, the effect thereof will be insufficient. When the content of C is too high, toughness will be reduced. Therefore, the content of C is 2.2 to 3.9 wt %.

Si promotes deoxidization and improves casting fluidity. However, when the content of Si is too low, the effect thereof will be insufficient. When the content of Si is too high, toughness will be reduced. Therefore, the content of Si is 0.5 to 3.5 wt %.

Mn is an element necessary for deoxidization and desulfurization. However, when the content of Mn is too low, the effect thereof will be insufficient. When the content of Mn is too high, toughness will be reduced. Therefore, the content of Mn is 0.1 to 2.0 wt %.

Ni improves hardenability and promotes the development of martensite. However, when the content of Ni is too low, the effect thereof will be insufficient. When the content of Ni is too high, austenite will become too stable and a large amount of residual austenite will be formed. Therefore, the content of Ni is 0.5 to 4.3 wt %.

Cr forms carbides and improves hardenability in the parent phase. However, when the content of Cr is too low, the amount of carbides will be reduced and abrasion resistance will deteriorate. When the content of Cr is too high, abnormal abrasion will be promoted due to coarsening of the carbides. Therefore, the content of Cr is 7.5 to 25 wt %.

Mo forms carbides and adheres to the parent phase to strengthen the parent phase. When the content of Mo is too high, toughness will be reduced. Therefore, the content of Mo is 0 to 8 wt %.

V forms carbides and improves abrasion resistance. When the content of V is too high, toughness will be reduced. Therefore, the content of V is 0 to 6 wt %.

The addition of B improves crushing strength. However, when the content of B is too low, the effect thereof will be minimized. When the content of B is too high, the above effect will not be demonstrated. Therefore, the content of B is 0.02 to 0.4 wt %.

Cr in the parent phase improves heat resistance. Graphite improves abrasion resistance and compatibility. Carbon boride improves abrasion resistance and seizing resistance. The contents of Cr, graphite, and carbon boride are interrelated and are adjusted according to the content of B. Therefore, the content of Cr in the parent phase is 2 to 5.41 wt %. The content of graphite is 0.05 to 0.35% of the surface area. The content of carbon boride is 19 to 40% of the surface area.

Exemplary Embodiments

Exemplary embodiments of the present invention are described below. Table 1 depicts the constituents, hardness, and crushing strength of exemplary embodiments of the present invention. Table 2 illustrates the constituents, hardness, and crushing strength of comparative examples. The content of Cr in the parent phase is depicted as wt % and the contents of graphite and carbon boride are depicted as a percentage of the surface area.

TABLE 1

| | Constituent wt % | | | | | | | | Amount of Cr in parent phase | Amount of graphite | Amount of carbon boride | Crushing strength kN |
|---|---|---|---|---|---|---|---|---|---|---|---|---|
| | C | Si | Mn | Ni | Cr | Mo | V | B | | | | |
| 1 | 2.75 | 1.57 | 0.77 | 1.30 | 15.5 | 2.30 | 1.43 | 0.02 | 3.24 | 0.05 | 26 | 6.3 |
| 2 | 2.70 | 1.56 | 0.77 | 1.31 | 15.4 | 0.01 | 1.43 | 0.05 | 3.26 | 0.15 | 24 | 6.6 |
| 3 | 2.71 | 1.58 | 0.76 | 1.30 | 15.4 | 2.31 | 1.44 | 0.11 | 3.17 | 0.20 | 22 | 9.2 |
| 4 | 3.21 | 1.55 | 0.73 | 1.30 | 15.1 | 2.35 | 1.51 | 0.05 | 3.41 | 0.05 | 32 | 7.4 |
| 5 | 2.70 | 0.57 | 0.21 | 1.29 | 15.4 | 2.28 | 1.43 | 0.17 | 3.10 | 0.22 | 25 | 7.8 |
| 6 | 2.65 | 1.58 | 0.75 | 1.26 | 15.3 | 2.27 | 1.42 | 0.40 | 2.97 | 0.10 | 29 | 6.2 |
| 7 | 2.72 | 1.58 | 0.77 | 1.28 | 15.4 | 2.20 | 0.01 | 0.08 | 3.02 | 0.14 | 24 | 6.5 |
| 8 | 3.36 | 1.30 | 0.75 | 1.31 | 14.9 | 2.42 | 0.01 | 0.08 | 2.22 | 0.11 | 29 | 6.1 |
| 9 | 2.71 | 1.59 | 0.75 | 1.29 | 15.9 | 2.31 | 4.95 | 0.11 | 4.93 | 0.18 | 21 | 7.0 |
| 10 | 2.24 | 1.58 | 0.75 | 1.26 | 15.3 | 2.27 | 1.42 | 0.40 | 2.97 | 0.10 | 24 | 6.5 |
| 11 | 3.03 | 1.30 | 0.52 | 1.88 | 14.2 | 2.03 | 1.09 | 0.10 | 3.05 | 0.11 | 33 | 7.1 |
| 12 | 3.20 | 1.81 | 0.96 | 1.55 | 15.9 | 2.56 | 1.70 | 0.25 | 3.14 | 0.31 | 28 | 7.2 |
| 13 | 3.48 | 1.04 | 1.96 | 1.04 | 16.3 | 4.10 | 0.80 | 0.03 | 2.71 | 0.07 | 36 | 5.9 |
| 14 | 3.94 | 1.20 | 0.11 | 3.33 | 7.5 | 7.58 | 2.40 | 0.07 | 1.96 | 0.06 | 40 | 5.8 |
| 15 | 3.65 | 0.54 | 1.38 | 4.30 | 9.8 | 5.40 | 2.10 | 0.04 | 2.01 | 0.09 | 33 | 6.2 |
| 16 | 3.40 | 3.45 | 1.97 | 0.52 | 25.1 | 0.80 | 5.98 | 0.12 | 5.30 | 0.35 | 39 | 6.5 |
| 17 | 3.20 | 3.40 | 1.98 | 3.20 | 17.8 | 1.60 | 0.01 | 0.09 | 2.81 | 0.14 | 29 | 6.4 |

TABLE 2

| | Constituent wt % | | | | | | | | Amount of Cr in parent phase | Amount of graphite | Amount of carbon boride | Crushing strength kN |
|---|---|---|---|---|---|---|---|---|---|---|---|---|
| | C | Si | Mn | Ni | Cr | Mo | V | B | | | | |
| 1 | 2.72 | 1.58 | 0.77 | 1.28 | 15.4 | 2.20 | 1.39 | 0.01 | 3.16 | 0.00 | 31 | 6.2 |
| 2 | 3.36 | 1.30 | 0.75 | 1.31 | 14.9 | 2.42 | 1.58 | 0.01 | 2.33 | 0.00 | 33 | 5.1 |
| 3 | 3.31 | 2.10 | 0.98 | 1.73 | 20.3 | 2.99 | 1.41 | 0.69 | 2.73 | 0.00 | 41 | 5.5 |
| 4 | 3.20 | 1.55 | 0.72 | 1.30 | 15.2 | 2.34 | 1.51 | 0.00 | 3.29 | 0.00 | 38 | 5.9 |
| 5 | 2.72 | 1.58 | 0.77 | 1.28 | 15.4 | 2.20 | 0.01 | 0.00 | 3.00 | 0.00 | 30 | 6.2 |
| 6 | 3.36 | 1.30 | 0.75 | 1.31 | 14.9 | 2.42 | 0.01 | 0.00 | 2.21 | 0.00 | 32 | 5.1 |
| 7 | 2.71 | 1.59 | 0.75 | 1.29 | 15.9 | 2.31 | 4.95 | 0.00 | 4.10 | 0.00 | 28 | 6.4 |
| 8 | 3.20 | 3.40 | 1.98 | 3.20 | 17.8 | 1.60 | 0.01 | 0.01 | 2.02 | 0.00 | 34 | 5.2 |
| 9 | 3.47 | 1.04 | 1.97 | 1.04 | 16.3 | 4.10 | 0.79 | 0.01 | 2.51 | 0.00 | 42 | 5.3 |
| 10 | 3.99 | 1.20 | 0.10 | 3.33 | 7.5 | 7.56 | 2.40 | 0.01 | 1.88 | 0.00 | 46 | 5.2 |
| 11 | 3.61 | 0.55 | 1.38 | 4.30 | 9.8 | 5.40 | 2.10 | 0.01 | 1.81 | 0.00 | 38 | 5.5 |
| 12 | 3.44 | 3.45 | 1.97 | 0.51 | 24.8 | 0.80 | 5.98 | 0.01 | 4.85 | 0.00 | 45 | 5.5 |
| 13 | 3.21 | 3.39 | 1.98 | 3.19 | 17.6 | 1.56 | 0.01 | 0.01 | 1.91 | 0.00 | 34 | 5.4 |

Figure 3:
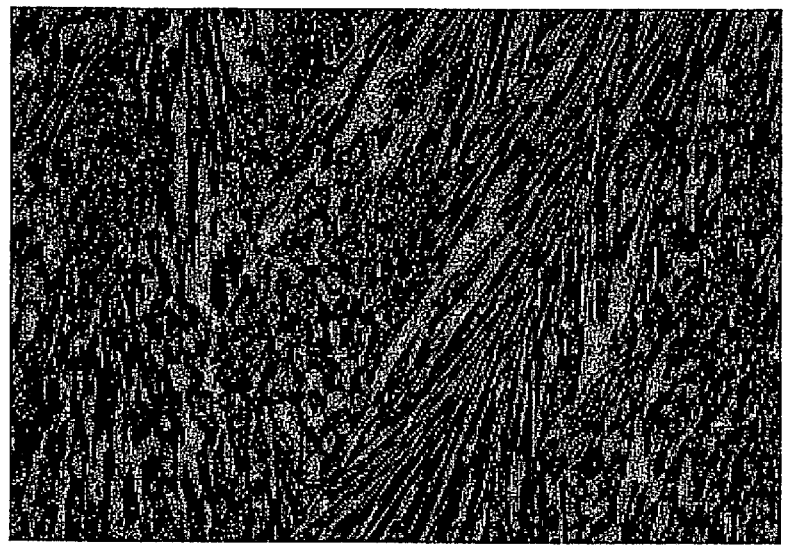
FIG. 3 is a surface photograph of a sample illustrating a method for measuring the surface area % of carbon boride.

The method for measuring the percentage of surface area of the carbon boride is as follows. Samples of the examples and the comparative examples are polished with a 1 μm alumina grindstone and then the carbides are brought into view by etching the samples in a Nital etching liquid. As an example, a surface photograph of example 13 in a state in which carbides are brought into view is depicted in FIG. 3. Portions with colors lighter than the other portions in FIG. 3 are the carbides. The carbides are identified with image processing from the surface photograph obtained in this way, and the proportion of the surface area occupied by the carbides versus the entire surface area is derived as the carbon boride surface area %.

Figure 4:
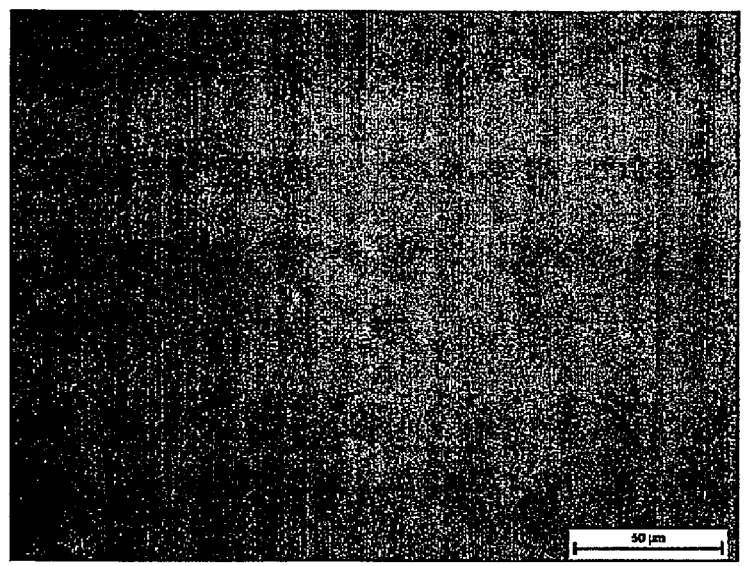
FIG. 4 is a surface photograph of a sample illustrating a method for measuring the surface area % of graphite.

The method for measuring the percentage of surface area of graphite is as follows. Samples of the examples and the comparative examples are polished with a 1 μm alumina grindstone and then observed under a microscope. A photomicrograph of the example 2 is depicted in FIG. 4 as an example. The surface area proportion of the entire surface occupied by the black portions (graphite) in the photomicrograph obtained in this way is derived as the surface area % of graphite.

Figure 5:
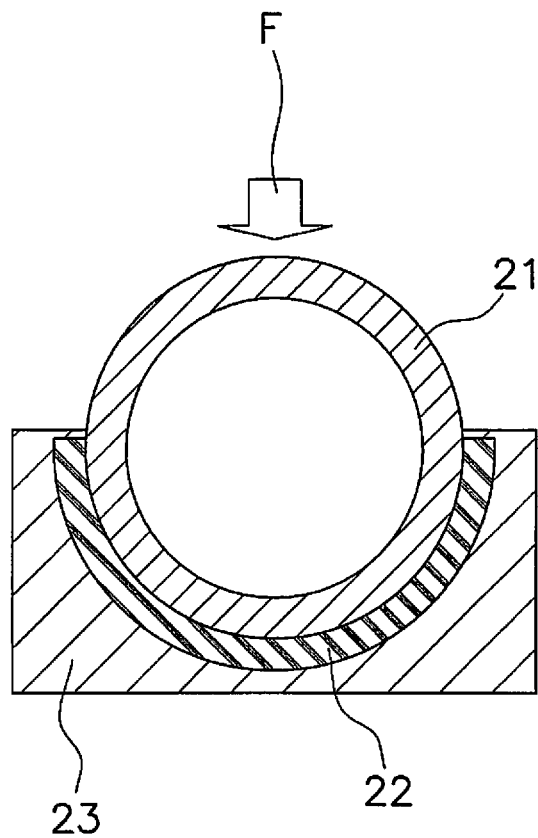
FIG. 5 illustrates a method for evaluating crushing strength.

FIG. 5 illustrates a method for evaluating crushing strength. As illustrated in FIG. 5, a floating seal 21 is arranged on a cradle 23 with an O-ring 22 interposed therebetween. A compressive load F is applied in the radial direction of the floating seal 21 and the load when the floating seal 21 breaks is measured.

As a result, graphite is separated when the content of B is within a range of 0.02 to 0.4 wt % as described in examples 1 to 17. However, graphite is not separated when the content of B is 0.01 wt % or less as in the comparative examples 1, 2 and 4 to 13. Graphite is not separated when the content of B is 0.69% as illustrated in comparative example 3. Furthermore, the crushing strength in the examples 1 to 17 is improved in comparison to that of the comparative examples 1 to 13 as can be seen in tables 1 and 2.

Figure 6:
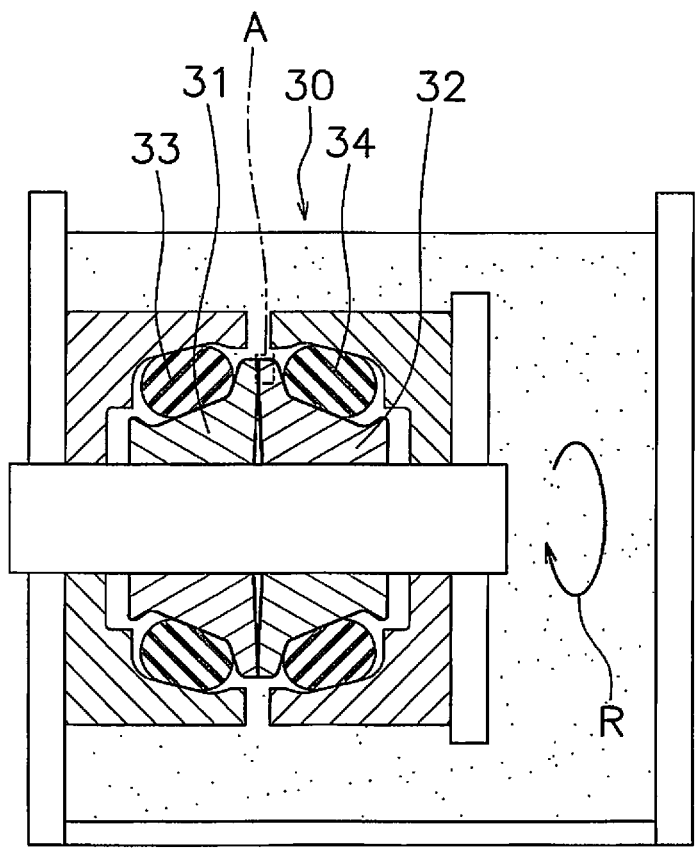
FIG. 6 is a schematic view of a seal tester configuration.

The sliding surface of the floating seal is exposed locally to high temperatures of around 500° C. due to sliding and adhesion from the rotation of the rotating side member. As a result, the floating seal after use shows a tendency for softening due to annealing. Therefore, changes before and after the use of example 4 and comparative example 4 were evaluated using a seal tester 30 illustrated in FIG. 6. As illustrated in FIG. 6, a pair of floating seals 31 and 32 were arranged in muddy water in the seal tester 30. The floating seal 31 was fixed to an O-ring 33. A load was applied to the other floating seal 32 via an O-ring 34 while a rotation R around the center axis was applied to the floating seal 32. The sliding surfaces were pressed against each other. A pushing linear load (linear load=pushing load/circumference of seal outer diameter) of 2.5 kgf/cm was applied to the sliding surfaces and a durability test was conducted for 300 hours while enclosed in EO #30 engine oil. Abrasion resistance, seizing resistance, and compatibility were evaluated based on changes in abrasion amount, appearance, and hardness after the testing.

Figure 7:
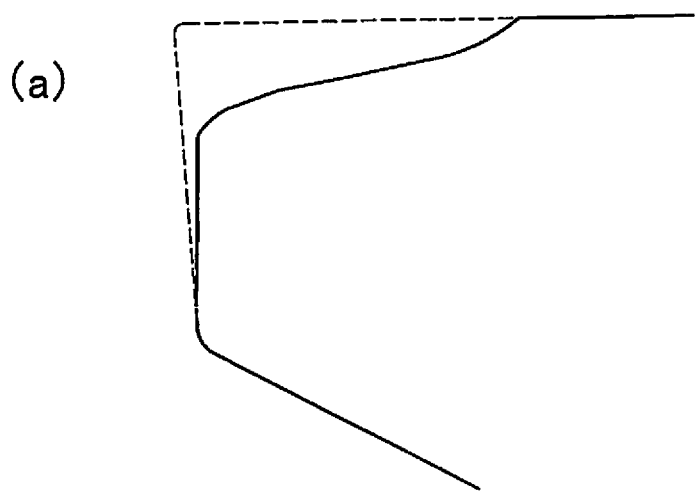
FIGS. 7A and 7B illustrate changes in the contours of a sliding surface of a floating seal before and after testing.
Figure 7:
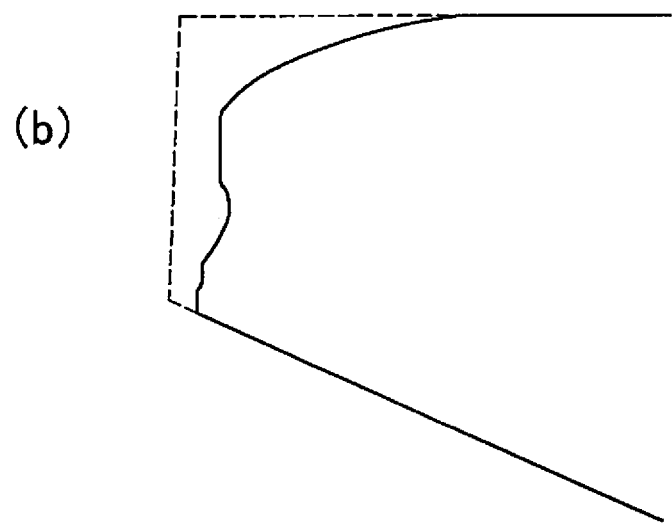

The changes in the sliding surfaces before and after the testing are illustrated in FIG. 7. The dashed line in FIGS. 7(a) and 7(b) represents the shape in the vicinity (see portion A in FIG. 6) of the sliding surface before testing. The solid line in FIGS. 7(a) and 7(b) represents the shape in the vicinity of the sliding surface after testing. FIG. 7(a) illustrates the vicinity of the sliding surface of the floating seal according to example 4. FIG. 7(b) illustrates the vicinity of the sliding surface of the floating seal according to comparative example 4. FIGS. 7(a) and 7(b) depict changes in vertical and horizontal comparisons for ease of observation. The amount of abrasion of the sliding surface in the example 4 is less than that of the comparative example 4 as can be clearly seen in FIGS. 7(a) and 7(b).

Figure 8:
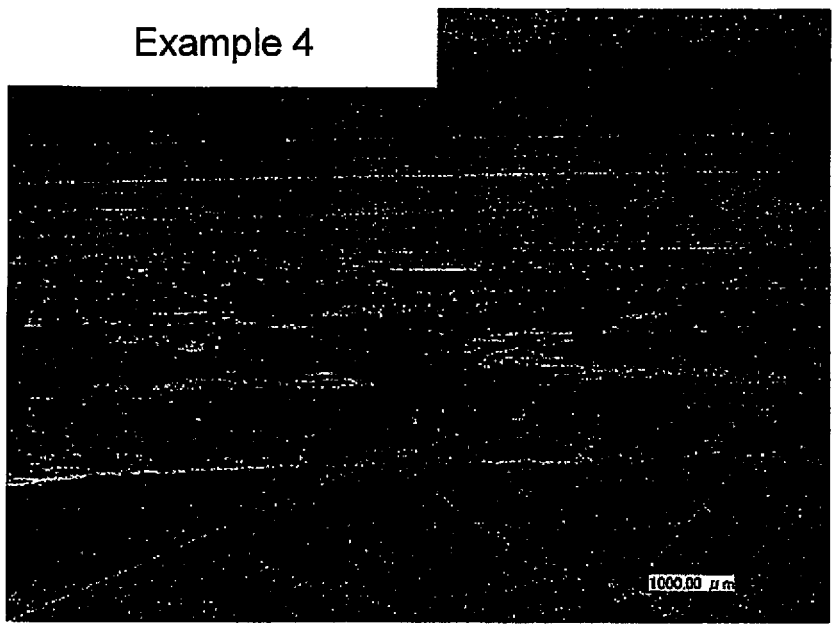
FIGS. 8A and 8B illustrate appearances of sliding surfaces of floating seals after testing.
Figure 8:
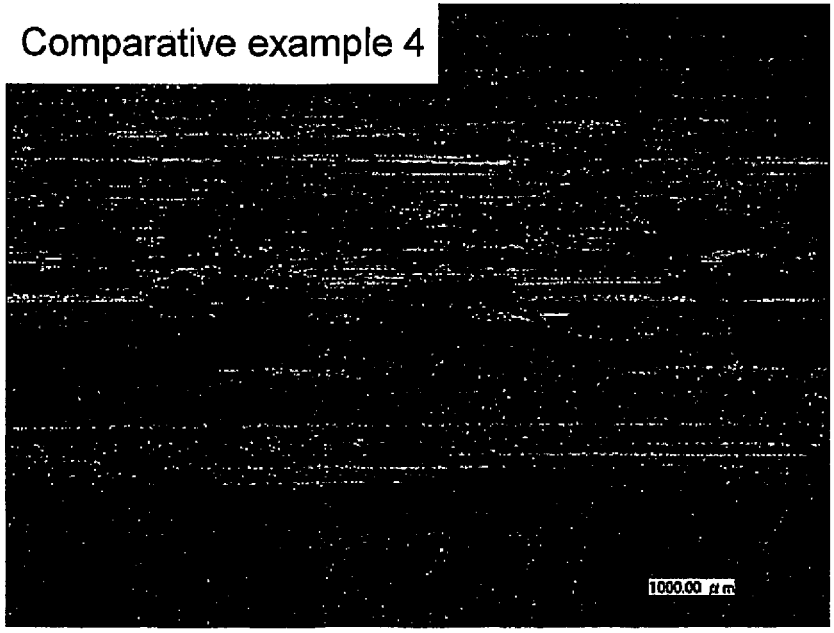

The appearances the sliding surfaces before and after the testing are illustrated in FIGS. 8(a) and 8(b). FIG. 8(a) is an enlargement of the sliding surface of the floating seal according to example 4. FIG. 8(b) is an enlargement of the sliding surface of the floating seal according to comparative example 4. It can be seen that seizing is reduced and compatibility is improved in the floating seal according to example 4 in comparison to the floating seal according to comparative example 4 based on observation of the appearance of the sliding surfaces after testing.

Changes in the hardness of the sliding surfaces before and after the testing are illustrated in table 3. As indicated in table 3, the sliding surface of the floating seal according to comparative example 4 is harder than the sliding surface of the floating seal according to example 4 before testing. However, the sliding surface of the floating seal according to example 4 is harder than the sliding surface of the floating seal according to comparative example 4 after testing. Therefore, it can be seen that softening due to annealing of the sliding surface is limited more in the floating seal according to example 4 than the floating seal according to comparative example 4.

TABLE 3

|  | Hardness before testing (Hv) | Hardness after testing (Hv) |
|---|---|---|
| Example 4 | 858 | 824 |
| Comparative example 4 | 891 | 803 |

According to the exemplary embodiments of the present invention, a floating seal that allows for improvements in strength, heat resistance, and abrasion resistance while limiting a reduction in manufacturing efficiency can be provided.

What is claimed is:

1. A floating seal comprising C, Si, Mn, Ni, Cr, Mo, V, and B with a remainder being made up of Fe and unavoidable impurities, wherein the the floating seal contains C, Si, Mn, Ni, Cr, Mo, V, and B in amounts as follows:
   C: 2.2 to 3.9 wt %
   Si: 0.5 to 3.5 wt %
   Mn: 0.1 to 2.0 wt %;
   Ni: 0.5 to 4.3 wt %;
   Cr: 7.5 to 25.0 wt %;
   Mo: greater than 0 to 8.0 wt %;
   V: greater than 0 to 6.0 wt %;
   B: 0.02 to 0.4 wt %; and
   a content of Cr in a parent phase is 2.00 to 5.41 wt %;
   a content of graphite is 0.05 to 0.35% of a surface area of the floating seal, and
   a content of carbon boride is 19 to 40% of the surface area.

2. The floating seal according to claim 1, wherein
   the content of Cr in the parent phase is 2.00 to 3.5 wt %;
   the content of graphite is 0.05 to 0.30% of the surface area, and
   the content of carbon boride is 25 to 35% of the surface area.

* * * * *